Patented Feb. 24, 1925.

1,527,799

UNITED STATES PATENT OFFICE.

NORBERT HEPPELLE, OF SPRINGFIELD, MASSACHUSETTS.

FILLING FOR BEAVER-BOARD JOINTS.

No Drawing.   Application filed April 28, 1924.   Serial No. 709,683.

*To all whom it may concern:*

Be it known that I, NORBERT HEPPELLE, a subject of the King of Great Britain, residing at Springfield, in the county of Hampden and State of Massachusetts, have invented new and useful Improvements in Filling for Beaver-Board Joints, of which the following is a specification.

An object of my invention is the production of a plastic composition or cement-like substance to be applied to the space between the ends of beaver board for the purpose of making or producing a smooth joint or surface between the ends of the board, and one that will intimately unite with the material composing the beaver board and will not shrink when dried, whereby it may be painted or finished to form a smooth surface across the joint. It is also water and fire proof.

My composition consists substantially of a mixture of fire clay, powdered asbestos, white lead, kerosene oil, common salt, dissolved in water and prepared in the following proportions by volume: fire clay, 20%; powdered asbestos, 25%–30%; white lead, 10%; kerosene oil, 5%; common salt and water, 40%. The whole being mixed together to form a pasty adhesive mass which is applied directly to the opening or space between the ends of the beaver board. The preparations may be varied within narrow limitations of those given without departing from the scope of the invention.

The composition is fire proof, very efficient, and a non-conductor of heat, impervious to water, adheres without cracking when it dries to the surface to which it is applied.

What I claim is:

A composition of matter for the purpose described consisting of fire clay, 20%; powdered asbestos, 25% to 30%; white lead, 10%; kerosene oil, 5%; and common salt and water about 40%; the whole being mixed together to form a pasty mass.

NORBERT × HEPPELLE.
his mark